US011399118B2

(12) United States Patent
Rosello et al.

(10) Patent No.: US 11,399,118 B2
(45) Date of Patent: Jul. 26, 2022

(54) COLOR PIPELINE

(71) Applicant: HEWLETT-PACKARD DEVELOPMENT COMPANY, L.P., Spring, TX (US)

(72) Inventors: Maxime Rosello, Sant Cugat del Valles (ES); Li Qian, Sant Cugat del Valles (ES); Pere Gasparin Talarn, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/272,417

(22) PCT Filed: Sep. 26, 2018

(86) PCT No.: PCT/US2018/052961
§ 371 (c)(1),
(2) Date: Mar. 1, 2021

(87) PCT Pub. No.: WO2020/068074
PCT Pub. Date: Apr. 2, 2020

(65) Prior Publication Data
US 2021/0321017 A1    Oct. 14, 2021

(51) Int. Cl.
*H04N 1/60* (2006.01)
*B41J 2/21* (2006.01)
*G06F 3/12* (2006.01)

(52) U.S. Cl.
CPC .......... *H04N 1/6022* (2013.01); *B41J 2/2132* (2013.01); *G06F 3/1208* (2013.01); *G06F 3/1255* (2013.01); *H04N 1/6094* (2013.01)

(58) Field of Classification Search
CPC .... H04N 1/6022; B41J 2/2132; G06F 3/1208; G06F 3/1255
See application file for complete search history.

(56) References Cited

U.S. PATENT DOCUMENTS

| 4,940,998 | A | * | 7/1990 | Asakawa | ............... B41J 2/2103 347/50 |
| 5,631,748 | A | * | 5/1997 | Harrington | .............. H04N 1/52 358/1.9 |
| 6,057,858 | A | * | 5/2000 | Desrosiers | ............ G06T 11/001 345/467 |

(Continued)

FOREIGN PATENT DOCUMENTS

| DE | 102007035805 | | 2/2009 | | |
| DE | 102007035805 A1 | * | 2/2009 | ......... | B41J 2/16526 |

(Continued)

*Primary Examiner* — Ted W Barnes
(74) *Attorney, Agent, or Firm* — HP Inc. Patent Department

(57) ABSTRACT

An example of a color management module is disclosed. The color management module is to generate a mapping from an incoming color space to a printer color space by a color pipeline. In the generation of the mapping, the color pipeline is adjusted so that the mapping of a target color associated with a first composition further includes adding a quantity of a second composition to the mapping of the target color. The second composition comprises a lower visibility than the first composition.

19 Claims, 5 Drawing Sheets

(56) References Cited

U.S. PATENT DOCUMENTS

| | | | |
|---|---|---|---|
| 6,522,427 B1 * | 2/2003 | Bhattacharjya | G06F 15/00 358/1.9 |
| 6,809,839 B1 * | 10/2004 | Earl | H04N 1/58 358/1.9 |
| 7,054,034 B2 * | 5/2006 | Underwood | H04N 1/6033 358/1.9 |
| 7,182,425 B2 | 2/2007 | Uwagaki | |
| 7,370,935 B2 | 5/2008 | Usuda | |
| 7,467,839 B2 | 12/2008 | Walmsley | |
| 8,998,378 B2 | 4/2015 | De Smet | |
| 9,434,156 B2 | 9/2016 | North | |
| 9,757,776 B2 * | 9/2017 | Nikic | B08B 7/0035 |
| 2003/0048316 A1 * | 3/2003 | Bruch | B41J 2/2052 347/12 |
| 2003/0081229 A1 * | 5/2003 | Underwood | H04N 1/6033 358/1.9 |
| 2009/0207458 A1 * | 8/2009 | Doggett, III | H04N 1/54 358/1.9 |
| 2014/0119779 A1 | 5/2014 | Zaretsky | |
| 2015/0217587 A1 * | 8/2015 | Pous | H04N 1/6033 347/6 |
| 2016/0077773 A1 * | 3/2016 | Singamsetty | G06F 3/1285 358/1.13 |
| 2017/0064145 A1 * | 3/2017 | Morovic | H04N 1/6033 |
| 2018/0007237 A1 * | 1/2018 | Morovic | H04N 1/6058 |
| 2020/0276802 A1 * | 9/2020 | Arakane | B41J 2/2142 |

FOREIGN PATENT DOCUMENTS

| | | | |
|---|---|---|---|
| EP | 0790128 A2 * | 8/1997 | |
| JP | H-10278287 | 10/1998 | |
| JP | 2011143623 A * | 7/2011 | |

\* cited by examiner

440A — WHEREIN THE SECOND COMPOSITION COMPRISES A MAGETA DYE AND THE FIRST COMPOSITION COMPRISES AT LEAST ONE OF A CYAN DYE AND/OR BLACK DYE

440B — WHEREIN THE SECOND COMPOSITION COMPRISES A YELLOW DYE AND THE FIRST COMPOSITION COMPRISES AT LEAST ONE OF A MAGENTA DYE, CYAN DYE AND/OR BLACK DYE

440C — WHEREIN THE SECOND COMPOSITION COMPRISES A CYAN DYE AND THE FIRST COMPOSITION COMPRISES A BLACK DYE

COLOR PIPELINE

BACKGROUND

Inkjet printers are systems that generate a printed image by propelling printing liquid through nozzles onto substrate locations associated with virtual pixels. The printing composition drops may comprise pigments or dyes disposed in a liquid vehicle. In some examples, the printing composition may be stored in a printing fluid repository. The accuracy of the selection of a dye concentration, and/or a pigment concentration may influence the control of the printing liquid propelling onto the substrate. Additionally, or alternatively, the accuracy in which the printing fluid drops are placed in the substrate locations may lead to a better print job quality or image quality (IQ).

BRIEF DESCRIPTION OF THE DRAWINGS

The present application may be more fully appreciated in connection with the following detailed description taken in conjunction with the accompanying drawings, in which like reference characters refer to like parts throughout and in which:

FIG. 4A is a flowchart of another example method for mapping color spaces.

FIG. 4B is a flowchart of another example method for mapping color spaces.

FIG. 4C is a flowchart of another example method for mapping color spaces.

DETAILED DESCRIPTION

Figure 1:
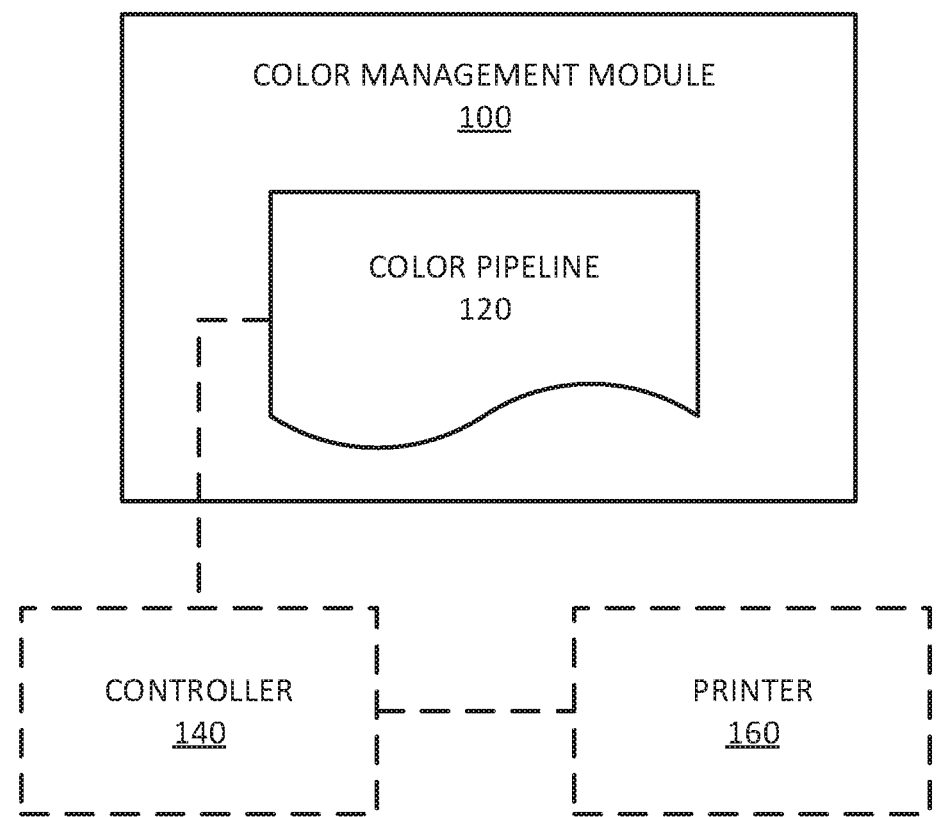
FIG. 1 is a block diagram illustrating an example of a color management module to generate a mapping.

The following description is directed to various examples of the disclosure. In the foregoing description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part on.

As mentioned above, inkjet printers are systems that generate a printed image by propelling printing fluid through nozzles onto substrate locations associated with virtual pixels. The printing composition drops may comprise pigments or dyes disposed in a liquid vehicle. In some examples, the printing composition may be stored in a printing fluid repository. The accuracy of the selection of a dye concentration, and/or a pigment concentration may influence the control of the printing liquid propelling onto the substrate. Additionally, or alternatively, the accuracy in which the printing fluid drops are placed in the substrate locations may lead to a better print job quality or image quality (IQ).

Some examples of printers comprise a plurality of nozzles distributed across a single or a plurality of printheads, wherein each nozzle is assigned to a single printing composition. In the present disclosure, the term "nozzle" should be interpreted as any cylindrical or round spout at the end of a pipe hose, or tube used to control a jet of printing composition.

During a printing operation, some nozzles may not propel printing fluid for an amount of time and, therefore the printing fluid located in the tip of the nozzle may experience direct contact with ambient air. If a portion of a printing fluid experiences direct contact with ambient air, the concentration of the portion of a printing fluid may vary. The concentration of a printing fluid may vary since the direct contact with ambient air may evaporate, at least in part, the liquid carrier of the printing fluid, therefore increasing the concentration of the dye of the printing fluid and/or the concentration of the pigment of the printing fluid. In these conditions, the drops of the printing fluid may be hard to control, and additional uncontrolled satellites may occur, leading to a reduction of the IQ of the print job. This issue, may be known as the so-called "decap".

Precisely, the "decap time" is the time in which a nozzle is uncapped, i.e. the time in which the concentration of the printing fluid does not vary due to the contact with ambient air. In an example, a nozzle is unused for an amount of time greater than the decap time, then the nozzle is most likely going to lead to decap issues, therefore experiencing a reduction of the IQ of the print job. In another example, a nozzle is unused for an amount of time shorter than the decap time, then the nozzle is most likely not going to lead to decap issues, therefore not experiencing any reduction of the IQ of the print job. The decap time may vary depending on many parameters that may affect the change of the printing fluid properties due to decap, for example, the printing fluid composition, temperature, humidity, size of the nozzle bore, and the like.

The plurality of nozzles may eject a printing composition. In an example, the composition may comprise a colorant and/or dye with a liquid carrier (e.g., cartridges and/or liquid toners). Some compositions may be dye based compositions, where dyes may be understood as a coloring solution. Other compositions may be pigment based compositions, where pigments may be understood as coloring articles in suspension. In another example, the composition may comprise ink particles and an imaging oil liquid carrier (e.g., liquid toner ink commercially known as HP ElectroInk from HP Inc.). In another example, the composition is an additive manufacturing fusing agent which may be an ink-type formulation comprising carbon black, such as, for example, the fusing agent formulation commercially known as V1Q60Q "HP fusing agent" available from HP Inc. In an additional example such a fusing agent may additionally comprise an infra-red light absorber. In another additional example, such a fusing agent may additionally comprise a visible light absorber. In yet another additional example such fusing agent may additionally comprise a UV light absorber. Examples of inks comprising visible light enhancers are dye-based colored ink and pigment-based colored ink (e.g., inks commercially known as CE039A and CE042A available from HP Inc.). In yet another example, the composition may be a suitable additive manufacturing detailing agent (e.g., formulation commercially known as V1Q61A "HP detailing agent" available from HP Inc.). A plurality of examples of the composition that may be propelled by a nozzle has been disclosed, however any other chemical composition comprising an agent in a liquid solvent or in a liquid carrier that may evaporate in contact with ambient air may be used without departing from the scope of the present disclosure.

Some printing system examples may comprise scanning printheads. Scanning printheads are printheads that are to move above and across the width of the media by propelling printing fluid thereon through printing passes. The term "printing pass" may be interpreted as the operation in which the scanning printhead moves at least from an edge of the width of the substrate to the opposite edge of the substrate. During the printing pass operation, a nozzle from the printhead may selectively propel an amount of the composition therethrough.

Some examples of printing systems may comprise service zones at the end of the width of the media to propel or spit printing fluid thereon to reduce the likelihood of decap occurrence, i.e., a decap spit. In the present disclosure, a "decap spit" may be interpreted as the spitting operation of a predetermined quantity of printing composition for purposes of reducing the likelihood of decap occurrence, and not necessarily for purposes of performing the print job. Precisely, a decap spit may be performed in the service zones to refresh the nozzles. These decap spits are the so-called servicing spits. Nonetheless, there are nozzles in which its decap time is shorter than the time a printhead scans across the width of the media, i.e., printing pass time, therefore long decap may occur in the composition from the nozzles before reaching the service zone leading to IQ defects derived therefrom.

Some printing system examples may decap spit on the media in zones that are of no interest to the user; e.g., areas of the media that do not comprise the print job. This decap spits are the so-called spit-on-page techniques. By printing on the media, the nozzle may not need to hold the decap spit until reaching the service zone. However, the decap spit is dependent on the print job, and some print jobs may not offer room for decap spit.

An example of the present disclosure may reduce the likelihood of long decap occurrence and the IQ defects derived therefrom, in the configuration process of the printer. The configuration operation comprises the setting up of the printer. A configured printer may print a plurality of print jobs with the same configuration. A printer configuration may comprise a plurality of operations to be performed, for example, the print mode configuration, the servicing configuration, the media configuration, the color pipeline configuration, and the like. The color pipeline configuration may define how colors are configured to be processed in subsequent print jobs. Some examples of operations in the color pipeline configuration may be: (i) mapping the colors from the incoming color space (e.g., color space of the print job) to the printer color space, also known as color map; (ii) deciding the total quantity of ink to be propelled, also known as linearization; and (iii) deciding how many dots of each composition to be propelled in a given area, also known as halftoning. In some examples, the color pipeline configuration may be performed by executing the "color pipeline". As used herein, the term "color pipeline" may be interpreted as a single file, or a group of files, that comprises the color pipeline configuration operations therein (e.g., color map, linearization, halftoning, and/or the like).

A "color space", "color model", or "color system" is an abstract mathematical model which describes a range of colors as tuples of numbers. Some examples comprise three or four values or color components. In other words, a color space is an elaboration of the coordinate system and subspace in which each color in the system is represented by a single dot. An example of a color space may comprise CIE, for example, CIE1931 XYZ, CIELUV, CIELAB, and CIEUVW. Another example of a color space may comprise RGB (Red, Green, Blue), for example, RGB, sRGB (standard EGB), Adobe RGB, and Adobe Wide Gamut RGB. Another example of a color space may comprise Lum plus chroma/chrominance, for example, YQ, YUV, YDbDr, YPbPr, YCbCr, ICtCp, and xvYCC. Another example of a color space may comprise the Cylindrical transformations, for example, HSV (Hue, Saturation, Value), HSV (Hue, Saturation, Value), CELCHab and CIELCHUV. In yet another example of color space may comprise CMYK (Cyan, Magenta, Yellow, Black). This is an open list of color spaces, many variations of color components to define a new color space may be performed without departing from the scope of the present disclosure. For simplicity, reference to the CMYK color space will be done hereinafter, however any other color space may apply.

In the present disclosure reference is made to a printing system, printing apparatus, printing device, and/or printer. The terms "printing system", "printing apparatus", "printing device", and/or "printer" should be read in their broad definition, therefore being any image recording system that uses at least one printhead. In an example, the printing system may be a two-dimensional (2D) desk printer. In another example, the printing system may be a 2D large format printer. In another example, the printing system may be a printing press, for example, an offset printing press. In yet another example, the printing system may be a three-dimensional (3D) printer and/or an additive manufacturing system.

An example of the present disclosure provides a color management module. The color management module is to generate a mapping from an incoming color space to a printer color space by a color pipeline. In the generation of the mapping, the color management module adjusts the color pipeline so that the mapping of a target color associated with a first composition further includes adding a quantity of a second composition to the mapping of the target color. In the example, the second composition comprises a lower visibility than the first composition.

Another example of the present disclosure provides a method comprising a plurality of operations to be performed. The method comprises (i) determining a printer color space and an incoming color space from a print job. The method also comprises (ii) mapping the incoming color space to the printer color space through a color pipeline. The method further comprises that (iii) the color pipeline maps a target color associated with a first composition to the printer color space and wherein the color pipeline adds a second composition to the mapping of the target color being the second composition a composition with a lower visibility than the first composition.

Another example of the present disclosure provides a non-transitory machine-readable medium storing instructions executable by a processor. The processor being to receive a print job in an incoming color space. The non-transitory machine-readable medium comprises (i) instructions to map the incoming color space of the print job to a printer color space through a color pipeline, wherein the color pipeline is modified so that mapping at least one of a cyan dye and/or black dye to the printer color space further includes adding a quantity of a magenta dye. The non-transitory machine-readable medium also comprises (ii)

instructions to eject the quantity of the magenta dye on a printing area during the print job operation.

Referring now to the drawings, FIG. 1 is a block diagram illustrating an example of a color management module 100 to generate a mapping. The color management module 100 may be any combination of hardware and programming to implement the functionalities of the color management module 100 described herein. In some examples herein, such combinations of hardware and programming may be implemented in a number of different ways. For example, the programming of modules may be processor-executable instructions stored on at least one non-transitory machine-readable storage medium and the hardware for modules may include at least one processor to execute those instructions. In some examples described herein, multiple modules may be collectively implemented by a combination of hardware and programming, as described above. In other examples, the functionalities of the color management module 100 may be, at least partially, implemented in the form of electronic circuitry.

The color management module 100 comprises a color pipeline 120 that generates a mapping from an incoming color space to a printer color space. In some examples, the incoming color space (e.g., the color space of the print job) may be the same color space as the printer color space. In other examples, the incoming color space may be a different color space as the printer color space. In some examples, the mapping may be a file, or group of files, comprising at least one look up table, wherein each target color or dye from the incoming color space is matched to its corresponding target color or dye from the printer color space. This is an example, and any other file or group of files intended to match an incoming color space to a target color space (e.g., printer color space) should be understood to be comprised within the scope of the mapping of the present disclosure.

In an example, the color management module 100 may adjust the color pipeline 120 based on a media to be used in subsequent printing operations. In another example, the color management module 100 may have a different color pipeline 120 based on a list of potential media to be used, in consequence, having different mappings between the input color space and the output color space depending on the media that is to be used. A wide variety of media to be printed onto may be used. In an example, a paper substrate may be used. Other examples may use different types of substrates, such as a fabric substrate (e.g., textile fabric), a polymeric substrate, and/or additive manufacturing build material. These are examples of substrates; however, other substrates may be used without departing from the scope of the preset disclosure.

The color management module 100 is to adjust the color pipeline 120 so that the mapping of a target color associated with a first composition further includes adding a quantity of a second composition to the mapping of the target color. The second composition comprises a lower visibility than the first composition. An example of an adjusted color pipeline 120 to generate a mapping is described in FIG. 2. The color management module 100 deals with reducing decap occurrence since it is to adjust the color pipeline 120 at the configuration stage of the printer. By performing the adjustment of the color pipeline 120, at the stage of performing the print job, some nozzles comprising the second composition may propel a quantity of the second composition substantially at the same location where the first composition is propelled. In an example, the first composition and the second composition may be propelled at the same location. In another example, the first composition and the second composition may be propelled in a near location. Without the adjustment, the nozzles comprising the second composition would not propel the quantity of the second composition in substantially the same location where the first composition is propelled. Since the second composition comprises a lower visibility than the first composition, the second composition has no visual effect on the first composition. However, since the nozzles comprising the second composition have propelled a quantity of the second composition, the composition of the nozzles have reduced the likelihood to experience decap.

As used herein, the term "about" and "substantially" are used to provide flexibility to a numerical range endpoint by providing that a given value may be, for example, an additional 20% more or an additional 20% less than the endpoints of the range. The degree of flexibility of this term can be dictated by the particular variable and would be within the knowledge of those skilled in the art to determine based on experience and the associated description herein.

In the examples disclosed herein, the term "visibility" should be interpreted as the "human eye visibility". The term visibility is anchored to the background color, since the visibility increases with the contrast between the color that is spited and the background color. For simplicity, a white background may be used in the examples herein, however the teaching of the present disclosure may be applied to any background color. Contrast between the yellow color and the white color is small, therefore leading to the yellow color to have a low visibility on white. Conversely, the contrast between the black color and the white color is big, therefore leading to the back color to have a high visibility on white. In an example, the color space of the printer is a CMYK color space. In the example, yellow (Y) has a lower visibility than cyan (C), magenta (M), and black (K); magenta (M), has a lower visibility than cyan (C), and black (K); cyan (C) has a lower visibility than black (K); and black is the composition that has the highest visibility of all the CMYK colors.

The color management module 100 may be to reduce the likelihood of long decap occurrence and the IQ defects derived therefrom in the nozzles comprising the second composition as a yellow (Y) dye. In an example, the color management module 100 may adjust the color pipeline 120 so that mapping a target color associated with a black dye (K), further includes adding a quantity of a yellow (Y) dye. In another example, the color management module 100 may adjust the color pipeline 120 so that mapping a target color associated with a cyan dye (C) further includes adding a quantity of a yellow (Y) dye. In yet another example, the color management module 100 may adjust the color pipeline 120 so that mapping a target color associated with a magenta (M) dye further includes a quantity of a yellow (Y) dye. Some examples of how the color management module 100 may reduce decap of the nozzles comprising a yellow (Y) composition have been disclosed, however any combinations from the above may be performed with an enhanced effectiveness, for example, by adjusting the color pipeline 120 so that mapping a target color associated with either a black (K), cyan (C), and/or magenta (M), further includes adding a quantity of yellow (Y) dye. These examples are based on the CMYK color space; however, any other color space may be use without departing from the scope of the present disclosure.

The color management module 100 may also be to reduce the likelihood of long decap occurrence and the IQ defects derived therefrom in the nozzles comprising the second composition as a magenta (M) dye. In an example, the color management module 100 may adjust the color pipeline 120 so that mapping a target color associated with a black dye (K), further includes adding a quantity of a magenta (M) dye. In another example, the color management module 100 may adjust the color pipeline 120 so that mapping a target color associated with a cyan dye (C) further includes adding a quantity of a magenta (M) dye. Some examples of how the color management module 100 may reduce decap of the nozzles comprising a magenta (M) composition have been disclosed, however any combinations from the above may be performed with an enhanced effectiveness, for example, by adjusting the color pipeline 120 so that mapping a target color associated with either a black (K), and cyan (C) further includes adding a quantity of magenta (M) dye. These examples are based on the CMYK color space; however, any other color space may be used without departing from the scope of the present disclosure.

The color management module 100 may also be to reduce the likelihood of decap occurrence and the IQ defects derived therefrom in the nozzles comprising the second composition as a cyan (C) dye. In an example, the color management module 100 may adjust the color pipeline 120 so that mapping a target color associated with a black dye (K), further includes adding a quantity of cyan (C) dye. This example is based on the CMYK color space; however, any other color space may be used without departing from the scope of the present disclosure.

The color management module 100 may be to reduce the likelihood of decap occurrence and the IQ defects derived therefrom in the nozzles comprising the second composition as a white (W) dye. In this example, the background color of the media may not be white since the contrast color of a white dye on a white background may be substantially zero, therefore the white dye being not visible on the white-colored background. In an example, the color management module 100 may adjust the color pipeline 120 so that mapping a target color associated with a black dye (K), further includes adding a quantity of a white (W) dye. In another example, the color management module 100 may adjust the color pipeline 120 so that mapping a target color associated with a cyan dye (C) further includes adding a quantity of a white (W) dye. In another example, the color management module 100 may adjust the color pipeline 120 so that mapping a target color associated with a magenta (M) dye further includes a quantity of a white (W). In yet another example, the color management module 100 may adjust the color pipeline 120 so that mapping a target color associated with a yellow (Y) dye further includes a quantity of white (W), Some examples of how the color management module 100 may reduce decap of the nozzles comprising a white (W) composition have been disclosed, however any combinations from the above may be performed with an enhanced effectiveness, for example, by adjusting the color pipeline 120 so that mapping a target color associated with either a black (K), cyan (C), magenta (M) and/or yellow (Y), further includes adding a quantity of white (W) dye. These examples are based on the CMYK color space; however, any other color space may be used without departing from the scope of the present disclosure.

The color pipeline 120 may comprise the quantity of the second composition selection. In an example, the quantity of the second composition may be selected to be above a decap threshold quantity. The "decap threshold" may be defined as the minimum quantity of second composition to reduce the likelihood of long decap occurrence, and therefore, the IQ defects derived therefrom. In another example, the quantity of the second composition may be selected to be below a hue shift threshold quantity. The "hue shift threshold" may be defined as the maximum quantity of second composition to be propelled in substantially the same location as the first composition so that there is no change of hue. The term "hue" should be interpreted as in its meaning in the art, being a property of light by which the color on an object is classified as red, blue, green, or yellow in reference to the spectrum. In yet another example, the quantity of the second composition is selected to be between a decap threshold quantity and a hue shift threshold quantity.

The color management module 100 may be associated with a controller 140. The controller 140 may be external to the color management module 100; however, in other examples, the color management module 100 may comprise the controller 140. The controller 140 may be associated with the color management module 100 through a physical wire or wireless. The term "controller" as used herein may include a series of instructions encoded on a machine-readable storage medium and executable by a single processor or a plurality of processors. Additionally, or alternatively, a controller may include one or more hardware devices including electronic circuitry, for example a digital and/or analog application-specific integrated circuit (ASIC), for implementing the functionality described herein.

The controller 140 may instruct a printer 160 to print a print job based on the adjusted color pipeline 120. The printer 160 may eject the quantity of the second composition and the first composition on a printing area during the print job operation. In an example, the controller 140 may be part of the printer 160. In another example, the controller 140 may be external but connected to the printer 160. The connection may be either through physical means (e.g., physical wire) or remote connection means (e.g., wireless).

The printer may be any image recording system that uses at least one printhead. In an example, the printing system may be a two-dimensional (2D) desk printer. In another example, the printing system may be a 2D large format printer. In another example, the printing system may be a printing press. In yet another example, the printing system may be a three-dimensional (3D) printer and/or an additive manufacturing system.

Figure 2:
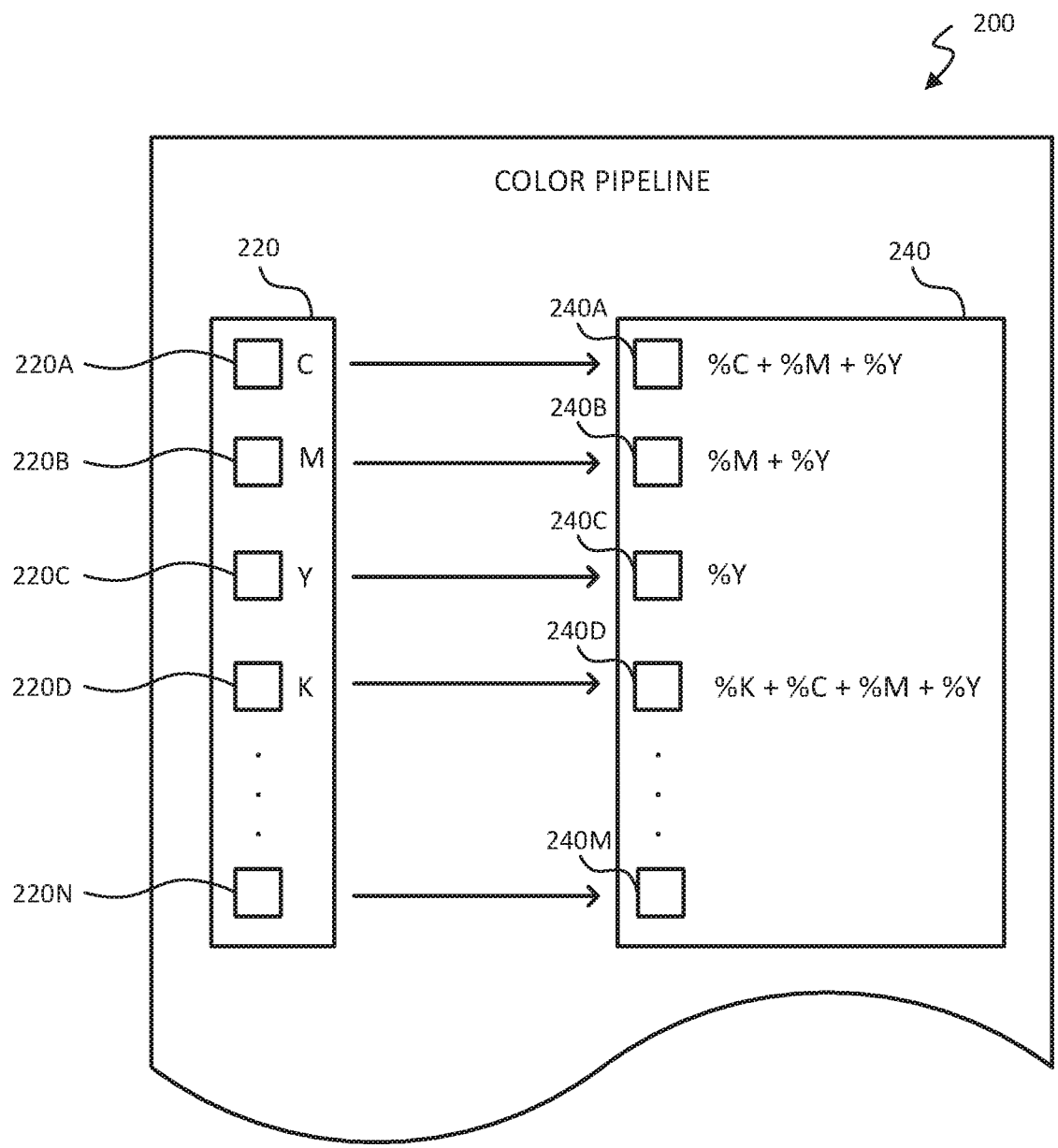
FIG. 2 is a block diagram illustrating an example of a color pipeline to generate a mapping.

FIG. 2 is a block diagram illustrating an example of a color pipeline 200 to generate a mapping. The color pipeline 200 may be the same as or similar to the color pipeline 120 from FIG. 1. The color pipeline 200 may generate a map from an incoming color space to a target color space. The incoming color space may be the print job color space. The target color space may be the printer (e.g., color space of the printer 160 from FIG. 1). In an example, the incoming color space and the target color space may be the same color space. In another example, the incoming color space and the target color space may be different color spaces.

The incoming color space may comprise a plurality of target colors or dyes, referred hereinafter as incoming color space dyes 220. The incoming color space dyes 220 may comprise a first incoming cyan (C) dye 220A, a second incoming magenta (M) dye 220B, a third incoming yellow (Y) dye 220C, a fourth incoming black (K) dye 220D, up to an Nth incoming dye, wherein N is a positive integer. The target color space may comprise a plurality of colors or dyes, referred hereinafter as target color space dyes 240. The target color space dyes 240 comprise a first target color space dye 240A, a second target color space dye 240B, a third target color space dye 240C, a fourth target color space dye 240D, up to an Mth target color space dye 240M, wherein M is a positive integer. The target color space dyes 240 may be the mapping of the incoming color space dyes 220 in the target color pace, i.e., each incoming color space dye 220A-220N has a corresponding target color space dye. In an example N and M are different integer numbers, i.e. a color in the incoming color space 220 may be mapped to a plurality of colors in the target color space 240 and/or a plurality of colors in the incoming space 220 may be mapped to a single color in the target color space 240. In another example N and M are the same integer number.

The first incoming cyan (C) dye 220A is mapped to the first target color space dye 240A. In an example, the first target color space dye 240A may comprise a dominant percentage of cyan (C) dye and another percentage of magenta (M) dye. In another example, the first target color space dye 240A may comprise a dominant percentage of cyan (C) dye and another percentage of yellow (Y) dye. In yet another example, the first target color space dye 240A may comprise a dominant percentage of cyan (C) dye, another percentage of magenta (M) dye, and another percentage of yellow (Y) dye. The cyan (C) dye of the first target color space dye 240A may correspond to the first composition. The magenta (M) dye, and the yellow (Y) dye of the first target color space dye 240A may correspond to the second composition.

The second incoming magenta (M) dye 220B is mapped to the second target color space dye 240B. In an example, the first target color space dye 240B may comprise a dominant percentage of magenta (M) and another percentage of yellow (Y). The magenta (M) dye of the second target color space dye 240B may correspond to the first composition. The yellow (Y) dye of the second target color space dye 240B may correspond to the second composition.

The third incoming yellow (Y) dye 220C is mapped to the third target color space dye 240C. In an example, the third target color space dye 240C may comprise a yellow (Y) dye. The yellow (Y) dye of the third target color space dye 240C may correspond to the first composition.

The fourth incoming black (K) dye 220D is mapped to the fourth target color space dye 240D. In an example, the fourth target color space dye 240D may comprise a dominant percentage of black (K) dye and another percentage of cyan (C) dye. In another example, the fourth target color space dye 240D may comprise a dominant percentage of black (K) dye and another percentage of magenta (M) dye. In another example, the fourth target color space dye 240K may comprise a dominant percentage of black (K) dye and another percentage of yellow (Y) dye. In yet another example, the fourth target color space dye 240D may comprise a dominant percentage of black (K) dye, and/or another percentage of cyan (C) dye, and/or another percentage of magenta (M) dye, and/or another percentage of yellow (Y) dye. The black (K) dye of the fourth target color space dye 240D may correspond to the first composition. The cyan (C) dye, magenta (M) dye, and the yellow (Y) dye of the fourth target color space dye 240D may correspond to the second composition.

For simplicity, the colors of the CMYK target color space have been disclosed. However, any combination of the above and/or the mapping of any color from any incoming color space to its corresponding color of any target color space may be applied apply without departing from the scope of the present disclosure.

Figure 3:
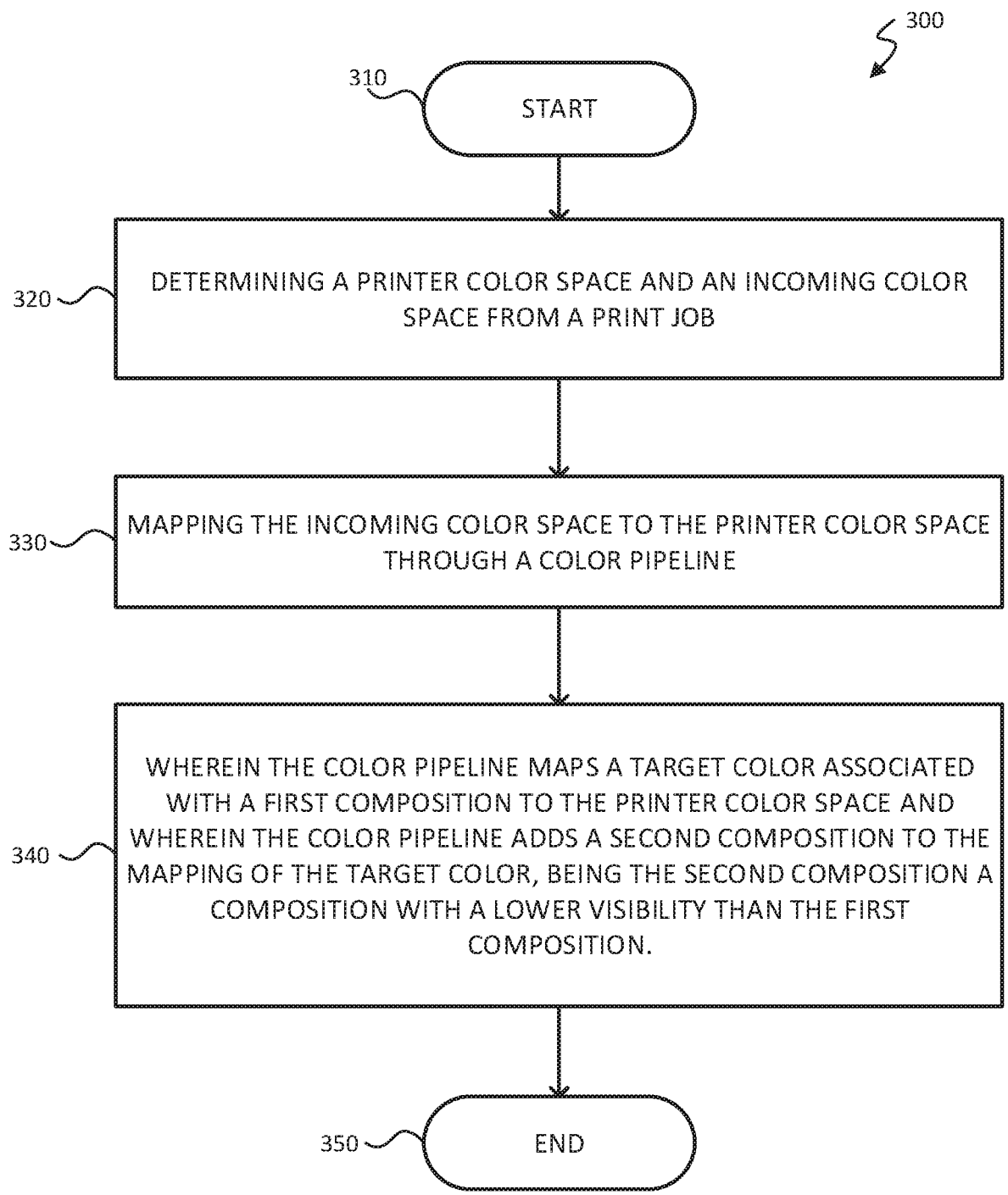
FIG. 3 is a flowchart of an example method for mapping color spaces.

FIG. 3 is a flowchart of an example method 300 for mapping color spaces. Method 300 may be described below as being executed or performed by a color management module, such as the color management module 100 of FIG. 1. Method 300 may be implemented in the form of executable instructions stored on a machine-readable storage medium and executed by a single processor or a plurality of processors of the color management module 100, and/or in the form of any electronic circuitry, for example digital and/or analog ASIC. In some implementations of the present disclosure, method 300 may include more or less blocks than are shown in FIG. 3. In some implementations, one or more of the blocks of method 300 may, at certain times, be performed in parallel and/or may repeat.

Method 300 may start at block 310, and continue to block 320, where a color management module or a controller connected to a color management module (e.g., color management module 100 and/or controller 140) determines a printer color space (e.g., color space from printer 160 from FIG. 1) and an incoming color space from a print job. At block 330, the color management module maps the incoming color space to the printer color space through a color pipeline (e.g., color pipeline 120 from FIG. 1, and/or FIG. 2). At block 340, the color pipeline maps a target color associated with a first composition to the printer color space and wherein the color pipeline adds a second composition to the mapping of the target color being the second composition a composition with a lower visibility than the first composition. At block 350, method 300 may end.

Method 400A from FIG. 4A, method 400B from 4B, and method 400C from FIG. 4C include variations of the method 300 from FIG. 3. FIG. 4A is a flowchart of another example method 400A for mapping color spaces. Method 400A may be described below as being executed or performed by a color management module, such as the color management module 100 of FIG. 1. Method 400A may be implemented in the form of executable instructions stored on a machine-readable storage medium and executed by a single processor or a plurality of processors of the color management module 100, and/or in the form of any electronic circuitry, for example digital and/or analog ASIC. In some implementations of the present disclosure, method 400A may include more or less blocks than are shown in FIG. 4A. In some implementations, one or more of the blocks of method 400A may, at certain times, be performed in parallel and/or may repeat. Method 400A may start at block 340 from FIG. 3, and continue to block 440A, wherein the second composition comprises a magenta (M) dye and the first composition comprises at least one of a cyan (C) dye and/or a black (K) dye. Method 400A may continue to block 350 from FIG. 3.

FIG. 4B is a flowchart of another example method 400E for mapping color spaces. Method 400B may be described below as being executed or performed by a color management module, such as the color management module 100 of FIG. 1. Method 400B may be implemented in the form of executable instructions stored on a machine-readable storage medium and executed by a single processor or a plurality of processors of the color management module 100, and/or in the form of any electronic circuitry, for example digital and/or analog ASIC. In some implementations of the present disclosure, method 400B may include more or less blocks than are shown in FIG. 4B. In some implementations, one or more of the blocks of method 400B may, at certain times, be performed in parallel and/or may repeat. Method 400B may start at block 340 from FIG. 3, and continue to block 440B, wherein the second composition comprises a yellow (Y) dye and the first composition comprises at least one of a magenta (M) dye, cyan (C) dye and/or a black (K) dye. Method 4003 may continue to block 350 from FIG. 3.

FIG. 4C is a flowchart of another example method 400C for mapping color spaces. Method 400C may be described below as being executed or performed by a color management module, such as the color management module 100 of FIG. 1. Method 400C may be implemented in the form of executable instructions stored on a machine-readable storage medium and executed by a single processor or a plurality of processors of the color management module 100, and/or in the form of any electronic circuitry, for example digital and/or analog ASIC. In some implementations of the present disclosure, method 400C may include more or less blocks than are shown in FIG. 4C. In some implementations, one or more of the blocks of method 400C may, at certain times, be performed in parallel and/or may repeat. Method 400C may start at block 340 from FIG. 3, and continue to block 440C, wherein the second composition comprises a cyan (C) dye and the first composition comprises a black (K) dye. Method 400C may continue to block 350 from FIG. 3.

Figure 5:
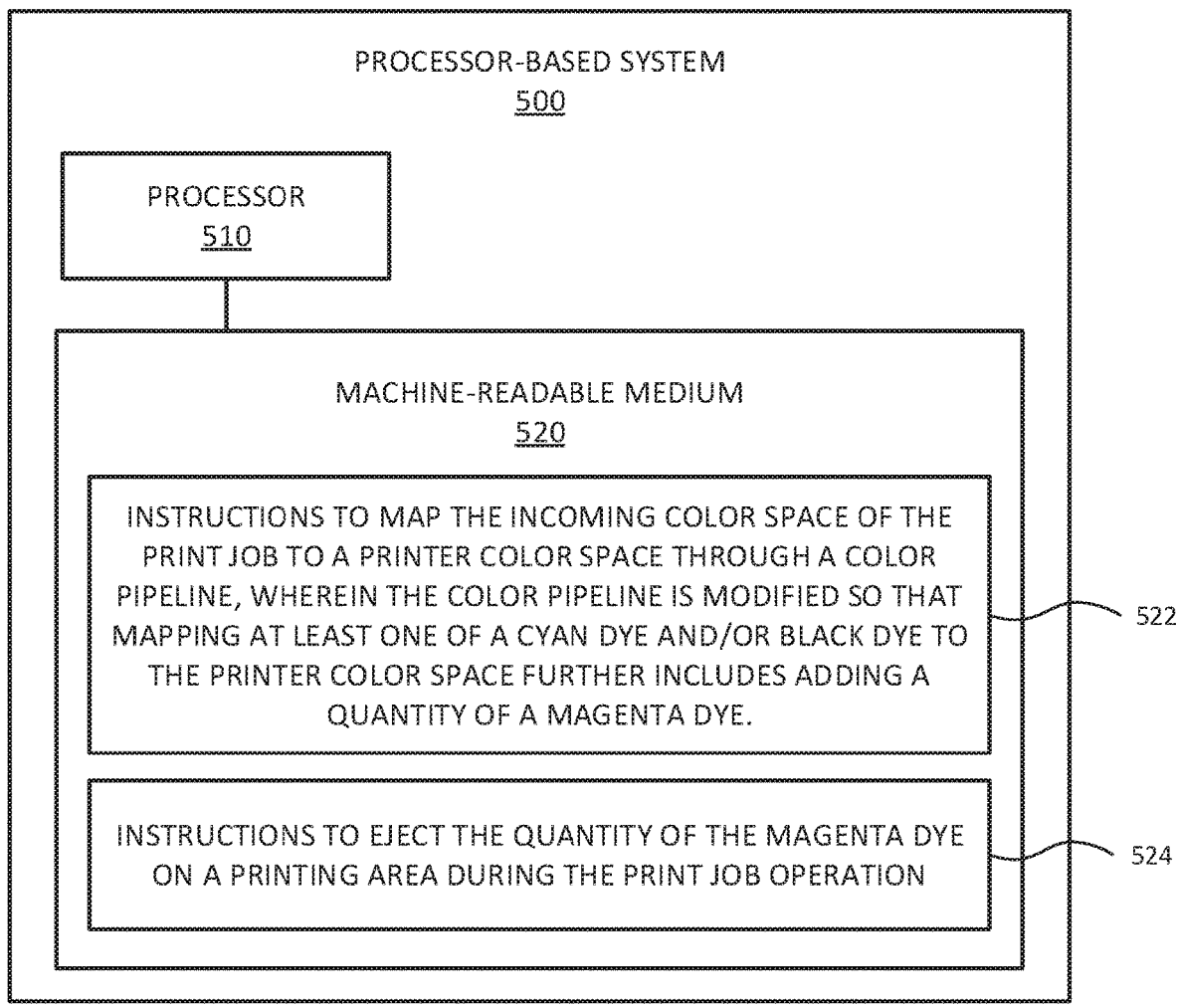
FIG. 5 is a block diagram illustrating an example of a processor-based system to map color spaces.

FIG. 5 is a block diagram illustrating a processor-based system 500 that includes a machine-readable medium encoded with example instructions to map color spaces. In some implementations, the system 500 may be or may form part of a printing device, such as a printer. In some implementations, the system 500 is a processor-based system and may include a processor 510 coupled to a machine-readable medium 520. The processor 510 may include a single-core processor, a multi-core processor, an application-specific integrated circuit (ASIC), a field programmable gate array (FPGA), and/or any other hardware device suitable for retrieval and/or execution of instructions from the machine-readable medium 520 (e.g., instructions 522, and 524) to perform functions related to various examples. Additionally, or alternatively, the processor 510 may include electronic circuitry for performing the functionality described herein, including the functionality of instructions 522, and/or 524. With respect of the executable instructions represented as boxes in FIG. 5, it should be understood that part or all of the executable instructions and/or electronic circuits included within one box may, in alternative implementations, be included in a different box shown in the figures or in a different box not shown.

The machine-readable medium 520 may be any medium suitable for storing executable instructions, such as a random-access memory (RAM), electrically erasable programmable read-only memory (EEPROM), flash memory, hard disk drives, optical disks, and the like. In some example implementations, the machine-readable medium 520 may be a tangible, non-transitory medium, where the term "non-transitory" does not encompass transitory propagating signals. The machine-readable medium 520 may be disposed within the processor-based system 500, as shown in FIG. 5, in which case the executable instructions may be deemed "installed" on the system 500. Alternatively, the machine-readable medium 520 may be a portable (e.g., external) storage medium, for example, that allows system 500 to remotely execute the instructions or download the instructions from the storage medium. In this case, the executable instructions may be part of an "installation package". As described further herein below, the machine-readable medium may be encoded with a set of executable instructions 522-524.

Instructions 522, when executed by the processor 510, may map the incoming color space of the print job to a printer color space through a color pipeline (e.g., color pipeline 120 from FIG. 1), wherein the color pipeline is modified so that mapping at least one of a cyan dye and/or black dye to the printer color space further includes adding a quantity of a magenta dye.

Instructions 524, when executed by the processor 510, may cause the processor 510 to eject the quantity of the magenta dye on a printing area during the print job operation.

The above examples may be implemented by hardware, or software in combination with hardware. For example, the various methods, processes and functional modules described herein may be implemented by a physical processor (the term processor is to be implemented broadly to include CPU, SoC, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processors, or a combination thereof.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

Example implementations can be realized according to the following clauses:

Clause 1: A color management module to (i) generate a mapping from an incoming color space to a printer color space by a color pipeline; and (ii) wherein the generation of the color mapping comprises adjusting the color pipeline so that the mapping of a target color associated with a first composition further includes adding a quantity of a second composition to the mapping of the target color, the second color composition comprising a lower visibility than the first color composition.

Clause 2: The color management module of clause 1, being associated with a controller to instruct a printer to print a print job based on the mapping.

Clause 3: The color management module of any preceding clause, wherein the printer is a large format printer.

Clause 4: The color management module of any preceding clause, wherein the printer is to eject the quantity of the second composition and the first composition on a printing area during the print job operation.

Clause 5: The color management module of any preceding clause, wherein the second composition comprises a magenta dye and the first composition comprises at least one of a cyan dye and/or a black dye.

Clause 6: The color management module of any preceding clause, wherein the second composition comprises a white dye.

Clause 7: The color management module of any preceding clause, wherein the second composition comprises a yellow dye and the first composition comprises at least one of a magenta dye, cyan dye, and/or a black dye.

Clause 8: The color management module of any preceding clause, wherein the second composition comprises a cyan dye and the first composition comprises a black dye.

Clause 9: The color management module of any preceding clause, wherein the quantity of the second composition is comprised between a decap threshold quantity and a hue shift threshold quantity.

Clause 10: The color management module of any preceding clause, further to generate the mapping based on a media to be used.

Clause 11: A method comprising (i) determining a printer color space and an incoming color space from a print job; (ii) mapping the incoming color space to the printer color space through a color pipeline; and (iii) wherein the color pipeline maps a target color associated with a first composition to the printer color space and wherein the color pipeline adds a second composition to the mapping of the target color being the second composition a composition with a lower visibility than the first composition.

Clause 12: The method of clause 11, wherein the second composition comprises a magenta dye and the first composition comprises at least one of a cyan dye and/or a black dye.

Clause 13: The method of any of the clauses 11 to 12, wherein the second composition comprises a yellow dye and the first composition comprises at least one of a magenta dye, cyan dye, and/or a black dye.

Clause 14: The method of any of the clauses 11 to 13, wherein the second composition comprises a cyan dye and the first composition comprises a black dye.

Clause 15: A on-transitory machine-readable medium storing instructions executable by a processor, the processor being to receive a print job in an incoming color space, the non-transitory machine-readable medium comprising (i) instructions to map the incoming color space of the print job to a printer color space through a color pipeline, wherein the color pipeline is modified so that mapping at least one of a cyan dye and/or a black dye to the printer color space further includes adding a quantity of a magenta dye; and (ii) instructions to eject the quantity of the magenta dye on a printing area during the print job operation.

What it is claimed is:

1. A color management module to
   generate a mapping from an incoming color space to a printer color space by a color pipeline;
   wherein the generation of the mapping comprises adjusting the color pipeline so that the mapping of a target color associated with a first composition further includes adding a quantity of a second composition to the mapping of the target color, the second composition comprising a lower visibility than the first composition; and
   wherein the color pipeline is adjusted based on a time needed to prevent decap in a nozzle ejecting the second composition.

2. The color management module of claim 1, being associated with a controller to instruct a printer to print a print job based on the mapping.

3. The color management module of claim 2, wherein the printer is a large format printer.

4. The color management module of claim 2, wherein the printer is to eject the quantity of the second composition and the first composition on a printing area during the print job operation.

5. The color management module of claim 1, wherein the second composition comprises a magenta dye and the first composition comprises a cyan dye.

6. The color management module of claim 1, wherein the second composition comprises a white dye.

7. The color management module of claim 1, wherein the second composition comprises a yellow dye and the first composition comprises at least one of a magenta dye and a cyan dye.

8. The color management module of claim 1, wherein the second composition comprises a cyan dye and the first composition comprises a black dye.

9. The color management module of claim 1, wherein the quantity of the second composition is comprised between a decap threshold quantity and a hue shift threshold quantity.

10. The color management module of claim 1, further to generate the mapping based on a media to be used.

11. A method comprising:
   determining a printer color space and an incoming color space from a print job;
   mapping the incoming color space to the printer color space through a color pipeline; and
   wherein the color pipeline maps a target color associated with a first composition to the printer color space and wherein the color pipeline adds a second composition to the mapping of the target color being the second composition a composition with a lower visibility than the first composition; and
   wherein the mapping is further based on a media to be used for the print job.

12. The method of claim 11, wherein the second composition comprises a magenta dye and the first composition comprises a cyan dye.

13. The method of claim 11, wherein the second composition comprises a yellow dye and the first composition comprises at least one of a magenta dye and a cyan dye.

14. The method of claim 11, wherein the second composition comprises a cyan dye and the first composition comprises a black dye.

15. The method of claim 11, wherein mapping the incoming color space to the printer color space by adding the second composition to the mapping of the target color is based on a need to prevent decap in a nozzle ejecting the second composition.

16. The method of claim 11, wherein the second composition comprises a white dye.

17. A non-transitory machine-readable medium storing instructions executable by a processor, the processor being to receive a print job in an incoming color space, the non-transitory machine-readable medium comprising:
   instructions to map the incoming color space of the print job to a printer color space through a color pipeline, wherein the color pipeline is modified so that mapping of a target color associated with a first composition further includes adding a quantity of a second composition to the mapping of the target color, the second composition comprising a lower visibility than the first composition; and
   instructions to eject the quantity of the second composition with the first composition on a printing area corresponding to the target color during the print job operation;
   wherein the quantity of the second composition is between a decap threshold quantity and a hue shift threshold quantity.

18. The non-transitory machine-readable medium of claim 17, wherein the color pipeline is further modified based on a media to be used for the print job.

19. The non-transitory machine-readable medium of claim 17, wherein the second composition comprises a white dye.

* * * * *